United States Patent [19]

Hungerford

[11] Patent Number: 4,723,639

[45] Date of Patent: * Feb. 9, 1988

[54] ROTARY HYDRAULIC SNUBBER WITH A BYPASS VALVE

[75] Inventor: Emory D. Hungerford, Milwaukie, Oreg.

[73] Assignee: ESCO Corporation, Portland, Oreg.

[*] Notice: The portion of the term of this patent subsequent to Sep. 2, 2003 has been disclaimed.

[21] Appl. No.: 900,797

[22] Filed: Aug. 27, 1986

Related U.S. Application Data

[63] Continuation-in-part of Ser. No. 630,516, Jul. 12, 1984, Pat. No. 4,609,081.

[51] Int. Cl.$^4$ .............................. F16F 9/14; B66C 1/00
[52] U.S. Cl. .................................. 188/307; 294/119.4
[58] Field of Search ............... 188/306, 307, 308, 309, 188/310, 290; 294/119.4

[56] References Cited

U.S. PATENT DOCUMENTS

| | | | |
|---|---|---|---|
| 845,088 | 2/1907 | Hotchkin | 188/309 |
| 1,833,969 | 12/1931 | Land | 188/306 |
| 1,920,218 | 8/1933 | Shultz | 188/309 |
| 1,942,658 | 1/1934 | Mitchell | 188/309 |
| 1,970,369 | 8/1934 | Focht | 188/306 |
| 2,060,554 | 11/1936 | Chryst | 188/310 |
| 2,070,409 | 2/1937 | Mitchell | 188/306 |
| 2,678,115 | 5/1954 | DeLoe | 188/308 |
| 3,237,728 | 3/1966 | Rumsey | 188/309 |
| 3,592,503 | 7/1971 | Lundberg | 294/119.4 |
| 4,609,081 | 9/1986 | Hungerford | 188/307 |

FOREIGN PATENT DOCUMENTS

| | | | |
|---|---|---|---|
| 288238 | 3/1914 | Fed. Rep. of Germany | 188/306 |
| 2635906 | 2/1978 | Fed. Rep. of Germany | 188/310 |
| 697983 | 1/1931 | France | 188/306 |
| 997275 | 1/1952 | France | 188/306 |
| 274744 | 7/1927 | United Kingdom | 188/310 |
| 376007 | 7/1932 | United Kingdom | 188/310 |

Primary Examiner—Sherman D. Basinger
Assistant Examiner—R. B. Johnson
Attorney, Agent, or Firm—Tilton, Fallon, Lungmus & Chestnut

[57] ABSTRACT

A hydraulic snubber suitable for a skidding grapple or the like in which a twisted figure eight housing is provided to oppose free swinging in two mutually perpendicular horizontal directions, each portion of the figure eight having a cylinder housing with a rotor, each rotor having radially extending vanes. At least one vane has a flexible extension including at least two orifices equipped with a pocket for adjustably limiting the flow of hydraulic fluid to each respective side of the vane. The cylinder housing is equipped with a safety relief valve so that hydraulic fluid can bypass a vane to prevent excessive pressure buildup on one side of the vane.

4 Claims, 6 Drawing Figures

ROTARY HYDRAULIC SNUBBER WITH A BYPASS VALVE

This application is a continuation-in-part of my co-pending application Ser. No. 630,516, filed July 12, 1984, now U.S. Pat. No. 4,609,081.

BACKGROUND AND SUMMARY OF INVENTION:

This invention relates to a hydraulic snubber and more particularly, to a hydraulic snubber especially advantageous in connecting the head assembly of a grapple to the boom mount such as are found on the rear frame of crawler or rubber-tired tractor skidders.

A grapple with which the invention can be used advantageously is seen in my earlier U.S. Pat. No. 4,358,147 and a skidding grapple is seen in co-owned U.S. Pat. No. 4,400,132.

Uneven ground and rapid changes in speed and direction of the skidder cause the empty grapple head assembly to swing violently when unrestrained. This swinging motion causes the grapple head to bang into the boom and rear frame of the skidder, resulting in damage to the boom, grapple and tractor.

The purpose of the snubber, which is the connecting link between the grapple head and boom, is to dampen the violent damage-causing motion out. At the same time, the snubber link, being a universal type joint, must allow controlled movement of up to 90° each side of plumb in the lateral and longitudinal direction relative to the tractor.

Current means of dampening this motion are subject to high maintenance and frequent adjustments in order to perform well with consistency and are rendered useless when contaminated with oil or grease. The inventive snubber described here requires no adjustment and infrequent maintenance. It is a sealed unit, has only two moving parts, and works on the known principle of force induced fluid displacement (see U.S. Pat. No. 3,592,503). Grease or other high viscosity synthetic lubricant is contained in two cylindrical chambers, divided into two inversely variable compartments.

Two diametrically opposed vanes cause the chamber division. One vane is integral with a rotatable housing, and the other with a rotor which is in turn keyed to a fixed pin (or the opposite may be the case). Chamber compartment volumes vary inversely as one vane is rotated relative to the other. This variation in volume causes the dampening medium to be forced from one compartment to the other across the vanes. The passage or area through which the dampening medium must cross is such that it restricts free flow and creates a pressure drop across the vanes so that free rotation is restricted. This effect is true with rotation in either direction.

According to the invention of my earlier application, a novel construction of snubber was provided which made possible universal joint action and further a vane extension configuration was provided that adjustably responded to pressure changes so as to achieve a desired snubbing or shock absorbing action.

During further tests the resilient vane tip/orifice pocket concept has proven to work quite well to dampen the swing of an empty grapple which is the purpose for which it was intended. In other words, the inertia of the empty grapple in motion is effectively controlled by the compensating action of the pressure induced variable orifice concept in the resilient vane.

These same tests also indicate that this system by itself has certain limitations when subjected to two extreme conditions: (1) the higher rotational inertia generated by a loaded grapple and (2) higher fluid viscosity caused by low ambient temperatures, and, of course, the two combined. The real problem caused by these extremes is pressure buildup in the chamber or chambers of the snubber as resistance to rotation is accomplished. Pressures in excess of 5,000 psi have been developed in laboratory and it is estimated that under actual working conditions in the field pressures of 8,000–10,000 psi may be possible.

1. Ambient temperature conditions: The combination of resilient vane material, orifice/pocket design and fluid viscosity based upon extensive tests, performed adequately in an ambient temperature range of between plus 30° to plus 90° F.

As the temperature falls below 30° F., the viscosity of the fluid increases and the flow is further inhibited through the vane tip orifices. This causes increased resistance to rotation beyond what is required and pressure rises in the snubber chamber to the point where sealing becomes a problem.

Resilient vane material and/or inherent fluid viscosity can be altered but still will only accomodate a relatively narrow temperature range. In many actual working conditions this would involve the necessity of changing one of these elements at least two or three times a year. In some cases such as Eastern Oregon and Washington where temperatures vary from −30° in the morning to +90° in the afternoon, this would have to be done twice a day. This, of course, is not acceptable and the snubber must be able to handle as broad a range of temperatures as possible with minimal adjustment to the components in the snubber.

2. High rotational inertia generated by a loaded grapple: This rotational inertia is directly related to the load in the grapple and the angular position of the center of gravity of the loaded grapple when it is off the suspended vertical. An empty grapple, inhibited by the snubber, will generally swing only a few degrees depending upon how tightly it is snubbed and the external forces acting upon it.

This, however, is not the case with a loaded grapple which does not really need a snubber to keep it from banging into the boom and tractor. As a loaded grapple is forced to rapidly change position behind the tractor due to rough terrain, stumps, trees, log decks, etc., the relative positions of the vanes in the snubber are forced to change at the same rate. Frequently, for example, the change can be 90° or more and can be made in one second or less.

In these extreme conditions, a large volume of snubbing fluid is forced through the orifices across the vanes in a very short period of time. This can build up very high pressures in the snubber chambers which is another source of seal problems.

Here again, the unit must be capable of accomodating these extreme conditions in a trouble-free manner and, in this case, there are no seasonal or daily adjustments that can be made to alleviate the problem.

It can be seen that a combination of these conditions would be even more aggravating to the seal problem. This complicated problem has been solved through the use of a valved bypass around the stationary vane.

Other objects and advantages of the invention may be seen in the details of the ensuing specification.

The invention is described in conjunction with the accompanying drawing, in which FIG. 1 is a fragmentary side elevational view, partly in section, the inventive snubber as installed on a skidding grapple;

DETAILED DESCRIPTION

ORIGINAL EMBODIMENT

Figure 1:
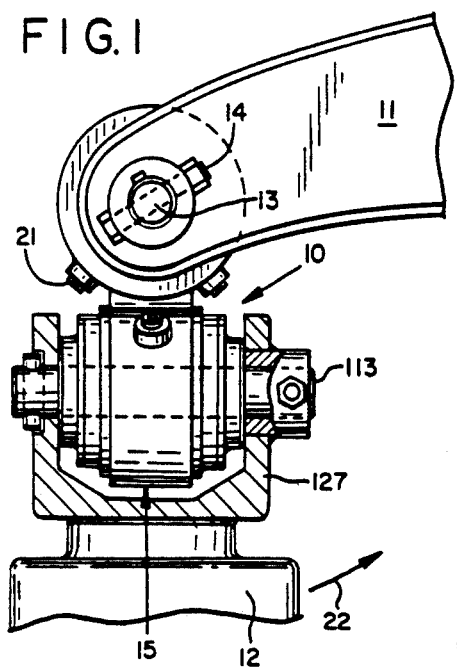

In the illustration given and with reference first to FIG. 1, the numeral 10 designates generally the inventive hydraulic snubber. It is seen interconnected between a boom 11 at the upper end and a head assembly 12 of a grapple at the lower end. It will be appreciated that analagous applications where swinging mass energy absorption is required can utilize the invention advantageously.

Still referring to FIG. 1, it will be seen that there is a pin 13 which is non-rotatably fixed to the boom 11 by means of a nut and bolt arrangement 14. This provides one horizontal axis of rotation for the grapple (not shown).

Figure 2:
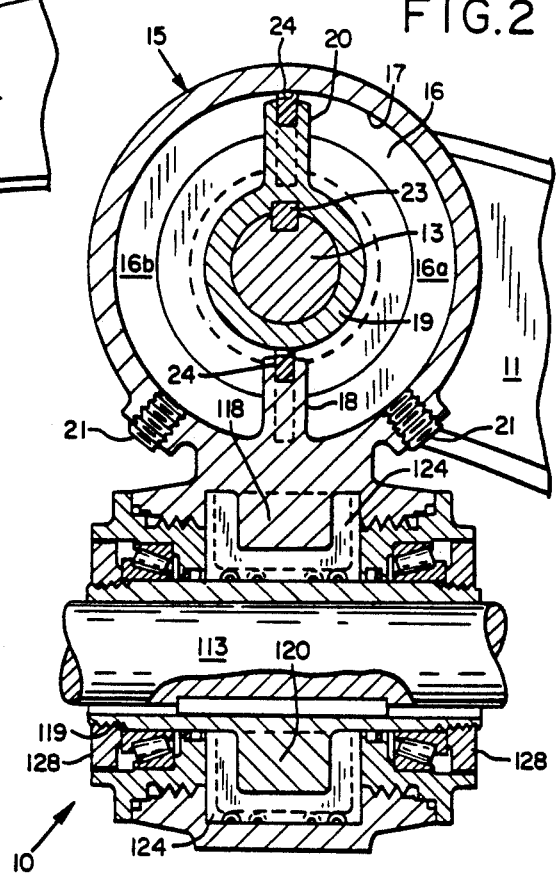
FIG. 2 is an enlarged fragmentary sectional view of the device seen in FIG. 1.

To achieve two degrees of rotation, I provide a cast body generally designated 15 (see FIG. 2). This provides a cylinder 16 having an interior wall 17. The wall 17 at one point has a radially extending vane 18 integral therewith while the pin 13 carries a rotor 19 within the chamber 16. The rotor 19 is in turn equipped with an integral, radially extending vane 20. The interior of the cylinder is filled with fluid through the fill ports 21.

Operation Generally

Figure 4:
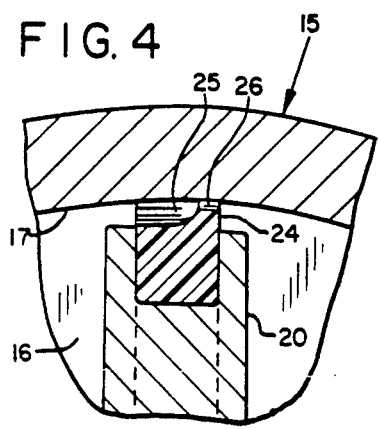
FIG. 4 is an enlarged fragmentary sectional view of the end of a vane equipped with the extension of FIG. 3 such as would be seen along the sight line 4—4 of FIG. 3 when the extension is installed on a vane.

As the grapple attempts to swing in toward the boom, i.e., in the direction of the arrow 22 applied to the lower right hand portion of FIG. 1, the body 15 starts to pivot around the pin 13. Inasmuch as the rotor 19 and integral vane 20 are fixed to the pin 13—see the key 23, the counterclockwise movement of the housing 15 decreases the volume to the right of the vane 18 also moving in the counterclockwise direction. This means that fluid has to flow past the vanes 18 and 20 from the right hand annulus portion 16a to the left hand portion 16b. This is modulated not only by the vanes 18 and 20, but more particularly, by the vane extensions 24—see particularly FIGS. 3 and 4.

Vane Extension

The vane extension 24 is seen to be U-shaped and rubs snugly against the interior faces of the body to form a tight seal. Advantageously, these vanes are constructed of elastomeric material such as urethane and are shaped so as to react to pressure demands produced by load swing. For low pressures, the medium can flow through either of the aligned orifices 25, 26—see the upper portion of FIG. 3. However, as the pressure demand builds in intensity and/or the time period shortens, the vane extensions are compressed away from the housing wall allowing more dampening fluid to pass. Then as the demand pressure drops off, the extension move back to their original position. This means that lower viscosity, hence, less temperature sensitive dampening medium can be used.

Figure 3:
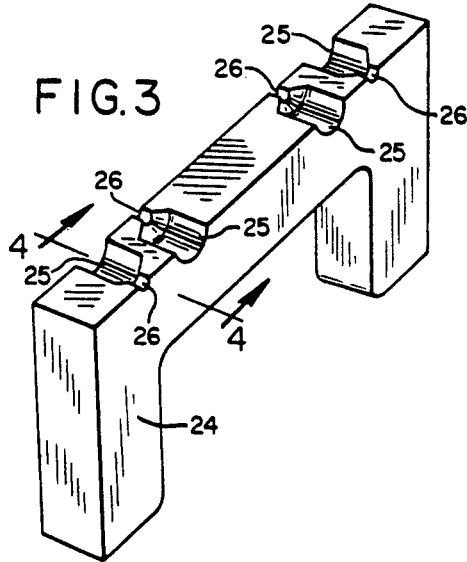
FIG. 3 is a perspective view of the vane extension employed in conjunction with the preceding views.

The vane tip orifice configuration shown in FIG. 3 is designed with pressure accumulating means in the form of the pocket type orifice 25 on each side of the individual vanes with the small groove orifice 26 leading off from the pocket means to the opposite side of the individual vane element.

The other degree of movement is provided by the structure at the bottom portion of the snubber 10. The degree of movement or rotation just described can be considered in the plane of the drawing while the one to be described in conjunction with the lower portion of the snubber can be considered to be in and out of the plane of the drawing. It will be appreciated that interiorly of the twisted FIG. 8 constituting the body 15, the upper and lower parts are identical. Therefore, the lower portions are given the same numeral designation as above—but with the addition of 100.

For example, the rotor supporting pin is designated 113—see the lower portion of FIG. 2. This has keyed to it the rotor 119 carrying the vane 120. The body 15—in its lower extent is equipped with the integral vane 118 and both the vanes 118 and 120 are equipped with extensions 124. The operation in the lower portion is exactly the same as that described above with respect to the transfer of hydraulic fluid from one annulus portion to the other upon rotation of one vane equipped element relative to the other.

Referring now to FIG. 1, it will be seen that the pin 113 is fixed to a clevis 127. The clevis 127 in turn carries the grapple head 12. So, when the grapple attempts to swing in a direction perpendicular to the plane of the drawing, the pin 113 and hence the rotor 119 pivot within the lower cylinder. The ends of each of the upper and lower cylinders are closed by means of hubs 128—see the lower right hand portion of FIG. 2—threaded into the body or housing 15.

The pressure sensitive vane extensions 24, 124 have overcome a problem existing with respect to the hydraulic dampening fluid. With the fixed orifice snubbers of the past, it was necessary to go to a less viscous fluid so as to achieve inter-annulus portion transfer under a variety of conditions. If too heavy a fluid were used, i.e., highly viscous, this would impede the operation at low temperatures. It is to be appreciated that grapples are used out-of-doors—in logging operations for example—where there can be wide temperature swings, even in the course of a day when performing logging in mountainous areas. By the same token, if the temperature rises excessively, the viscosity changes and the requisite opposition to swinging does not occur.

These problems have been avoided by the invention in which the orifice area can be more closely controlled, allowing the use of dampening fluids in which viscosity is less subject to temperature changes. The vane extension of the invention is pressure sensitive and effectively seals the clearance around the periphery of the vane except for the orifices at its tip. These orifices are constructed so that as the pressure reaches a critical point in the pocket means 25, the pressure will compress the flexible vane tip material, opening the orifice area and allowing more fluid to bypass. As pressure and vane material compressibility balance, orifice area is maintained and rotation resisting force stays the same. As pressure drops off, the flexible vane extension returns to its original shape. This results in flow past the extension equally in both directions from one side of each vane to the other. The vane extension thus becomes a pressure controlled (compensated) orifice and flow control device.

IMPROVED EMBODIMENT

Figure 5:
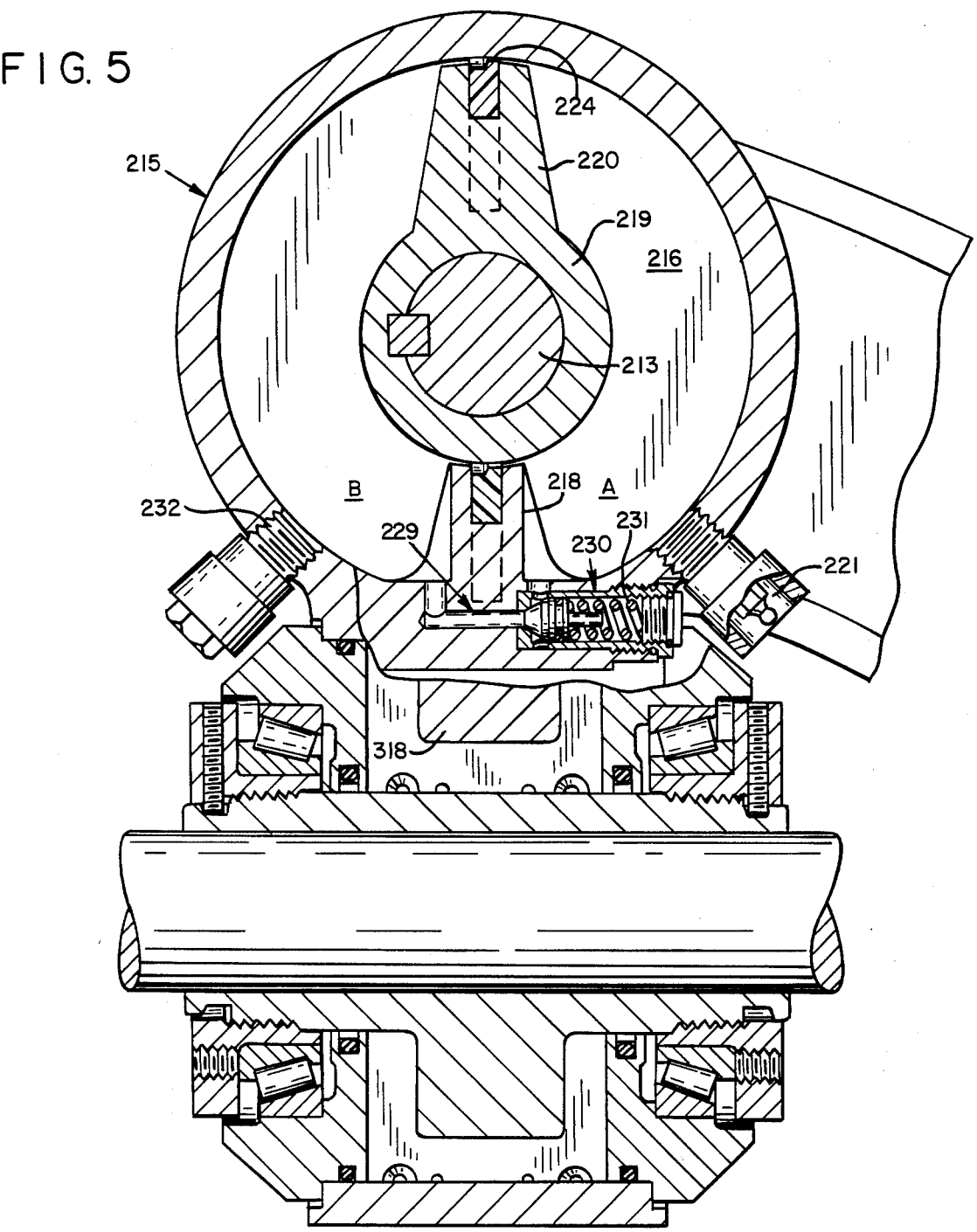
FIG. 5 is a sectional view essentially similar to that of FIG. 2 but featuring the improved valve bypass according to the invention.

The showing in FIG. 5 is essentially the same as that of FIG. 2 but with the addition of a valve bypass passage generally designated 229.

The similarity of the environment can be appreciated from the showing in FIG. 2 of a body generally designated 215 constituting the upper cylinder and which has an integral radially extending vane 218. Mounted for rotation within the chamber 216 of the body 215 is a pin 213 carrying the movable radially extending vane 220.

The lower cylinder also has a fixed vane 318 about which a corresponding bypass passage (not shown) is provided.

Figure 6:
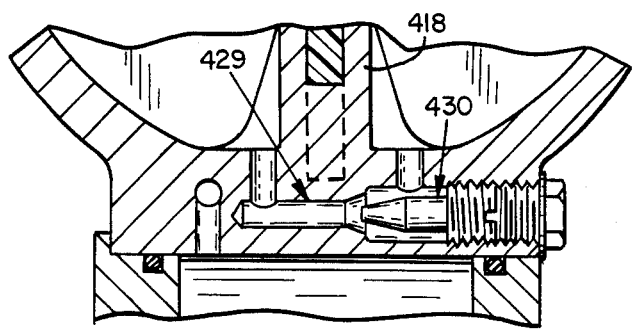
FIG. 6 is a fragmentary sectional view similar to a portion of FIG. 5 but showing a different type of valve for the bypass.

The showing in FIG. 6 is essentially the same as the upper portion of FIG. 5 wherein a bypass passage generally designated 429 is provided around the stationary vane 318 but in the case of the FIG. 6 showing, the valve 430 is a manually adjustable valve rather than the automatic pressure compensating valve 230 of FIG. 5. Each of the passages 229, 429 is generally U-shaped and is located within the body providing the cylinder, viz., the body 215 of FIG. 5. The U-shaped passage 229, for example, extends from one side of the integral radially extending vane 218 to the other side thereof with the base of the U-shape being extended to provide means for the receipt of the bypass valve.

OPERATION

In less than extreme conditions, the resilient vane extension-orifice/pocket arrangement constitute the primary control means for snubbing fluid bypass. As the rotor or housing rotate in the directions shown—the body 215 rotating counterclockwise or the rotor 219 rotating clockwise, chamber A will decrease in volume and chamber B will increase in volume. As a result of this rotation, fluid will pass through the pocket and orifice in the resilient vane extension from chamber A to chamber B.

As pressure builds up in the pockets of the vane extension 224, compressing the resilient vane material and expanding the orifice, more fluid will be allowed to bypass, thereby maintaining a relatively narrow pressure band.

The automatic pressure compensating needle bypass valve 230 constitutes the auxiliary control means for snubbing fluid bypass. This valve remains closed (loaded by a predetermined force in the spring 231) until such time as the primary bypass means—the orifice/pocket arrangement—can no longer maintain pressure below the predetermined maximum. As pressure approaches this predetermined maximum, whether due to low ambient temperature or high rotational inertia, this valve will open only as much as required to maintain that pressure.

Normally, no adjustment will be required on the valve 230 over a wide range of temperature and load conditions. If some adjustment is required, different springs could be installed and/or shimmed.

In the variation shown in FIG. 6, a manually adjustable needle bypass valve—auxiliary control means for snubbing fluid bypass is provided. When ambient temperature is low, raising fluid viscosity, the bypass valve 430 is adjusted to increase area of the passage allowing more fluid to pass, again maintaining a relatively narrow pressure band.

As the ambient temperature rises above a predetermined value, bypass valve 430 is adjusted to decrease the area allowing less fluid to bypass.

These adjustments would be made as much as twice a day but are very simple and would effectively broaden the overall temperature range and allow the unit to better handle the tendency to build-up detrimental pressure generated by high rotational inertia.

Through the use of the bypass passage arrangement of this invention, it is possible to have a totally sealed relationship with one of the vane extensions, i.e., no pockets or orifices, and utilize this pocket/orifice arrangement in only the other vane.

Also in the improved embodiment, I utilize only one of the ports for replenishing fluid as at 221 in the central right hand portion of FIG. 5. The other port as at 232 is equipped with a safety valve and is set at a pressure somewhat below that which would damage the seals or distort the housing, normally being adjustable to about 10,000 psi.

While in the foregoing specification a detailed description of the invention has been set down for the purpose of explanation, many variations in the details hereingiven may be made by those skilled in the art without departing from the spirit and scope of the invention.

I claim:

1. In a hydraulic snubber, a cylinder having a rotor axially disposed therein, said rotor being adapted to rotate relative to said cylinder, a first radially extending vane in said cylinder and a second radially extending vane on said rotor, means coupling the said rotor and cylinder between elements as to which the relative rotation is to be damped, each vane being equipped with a resilient extension for adjustably limiting the flow of fluid therepast and equally in both directions of rotation from one side of said vane to the other, each extension being equipped with at least two orifices communicating one side of its associated vane with the other, each orifice being equipped with a pocket, with the pockets in a given extension being located adjacent opposite sides of their associated extension, passage means operably associated with said cylinder and communicating one side of said first vane with the other side, and a valve in said passage means whereby additional fluid is adapted to bypass said first vane to prevent excessive pressure buildup on one side of said first vane.

2. The device of claim 1 in which said valve is equipped with automatic pressure compensating means.

3. The device of claim 1 in which said valve is equipped with manually operable adjusting means.

4. The device of claim 1 in which said cylinder is equipped with a safety relief valve.

* * * * *